United States Patent
Yasuda

(10) Patent No.: US 12,023,752 B2
(45) Date of Patent: Jul. 2, 2024

(54) METHOD OF RESISTANCE SPOT WELDING AND RESISTANCE SPOT WELDING APPARATUS

(71) Applicant: FUTABA INDUSTRIAL CO., LTD., Okazaki (JP)

(72) Inventor: Keigo Yasuda, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 351 days.

(21) Appl. No.: 17/368,042

(22) Filed: Jul. 6, 2021

(65) Prior Publication Data

US 2022/0009020 A1 Jan. 13, 2022

(30) Foreign Application Priority Data

Jul. 8, 2020 (JP) .................................. 2020-117775

(51) Int. Cl.
| | | |
|---|---|---|
| *B23K 11/11* | (2006.01) | |
| *B23K 11/16* | (2006.01) | |
| *B23K 11/30* | (2006.01) | |
| *B23K 103/04* | (2006.01) | |

(52) U.S. Cl.
CPC ........... *B23K 11/115* (2013.01); *B23K 11/163* (2013.01); *B23K 11/30* (2013.01); *B23K 2103/04* (2018.08)

(58) Field of Classification Search
CPC ... B23K 11/115; B23K 11/163; B23K 11/166; B23K 11/30; B23K 11/3018; B23K 11/318; B23K 2101/006; B23K 2101/18; B23K 2101/34; B23K 2103/04

USPC ........................................................ 219/91.2
See application file for complete search history.

(56) References Cited

FOREIGN PATENT DOCUMENTS

| EP | 2054718 | * | 5/2009 |
|---|---|---|---|
| JP | 2003164975 A | | 6/2003 |
| JP | 2003236676 A | | 8/2003 |
| JP | 2006055898 | * | 3/2006 |
| JP | 2006055898 A | | 3/2006 |
| JP | 2013173155 | * | 9/2013 |

(Continued)

OTHER PUBLICATIONS

Decision of Rejection for Chinese Patent Application No. 202110767720.0, mailed Feb. 17, 2023, 10 pages.

(Continued)

*Primary Examiner* — Dana Ross
*Assistant Examiner* — Joseph W Iskra
(74) *Attorney, Agent, or Firm* — Withrow + Terranova, PLLC; Vincent K. Gustafson

(57) ABSTRACT

The present disclose provides a method of resistance spot welding that can inhibit Liquid Metal Embrittlement-induced cracking in zinc-coated steel plates irrespective of the plate thicknesses. One aspect of the present disclosure provides a method of resistance spot welding that includes welding a workpiece with a resistance spot welding apparatus. The workpiece includes two or more steel plates in an overlapping state. The two or more steel plates include at least one steel plate coated with zinc. The welding includes causing a cooling rate of a high-tensile steel plate among the two or more steel plates to be higher than a cooling rate of an other steel plate among the two or more steel plates. The high-tensile steel plate has a tensile strength higher than a tensile strength of the other steel plate.

8 Claims, 5 Drawing Sheets

(56) References Cited

FOREIGN PATENT DOCUMENTS

JP    2013173155 A    9/2013
JP    2019171450 A    10/2019

OTHER PUBLICATIONS

First Office Action for Chinese Patent Application No. 202110767720.0 mailed Aug. 15, 2022, 14 pages including English translation.
Notice of Reasons for Refusal for Japanese Patent Application No. 2020117775, mailed Jun. 7, 2022, 6 pages.
Notice of Reasons for Refusal for Japanese Patent Application No. 2020117775, mailed Sep. 6, 2022, 7 pages.

* cited by examiner

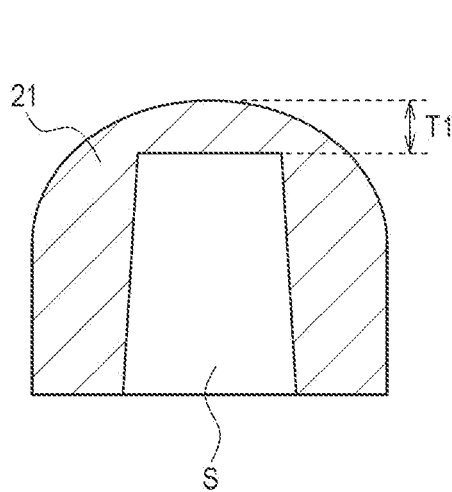 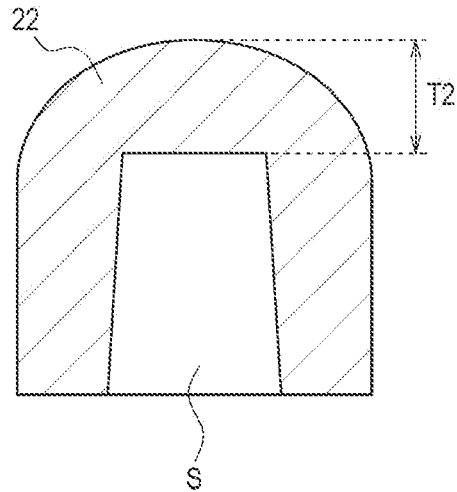
FIG. 4A  FIG. 4B
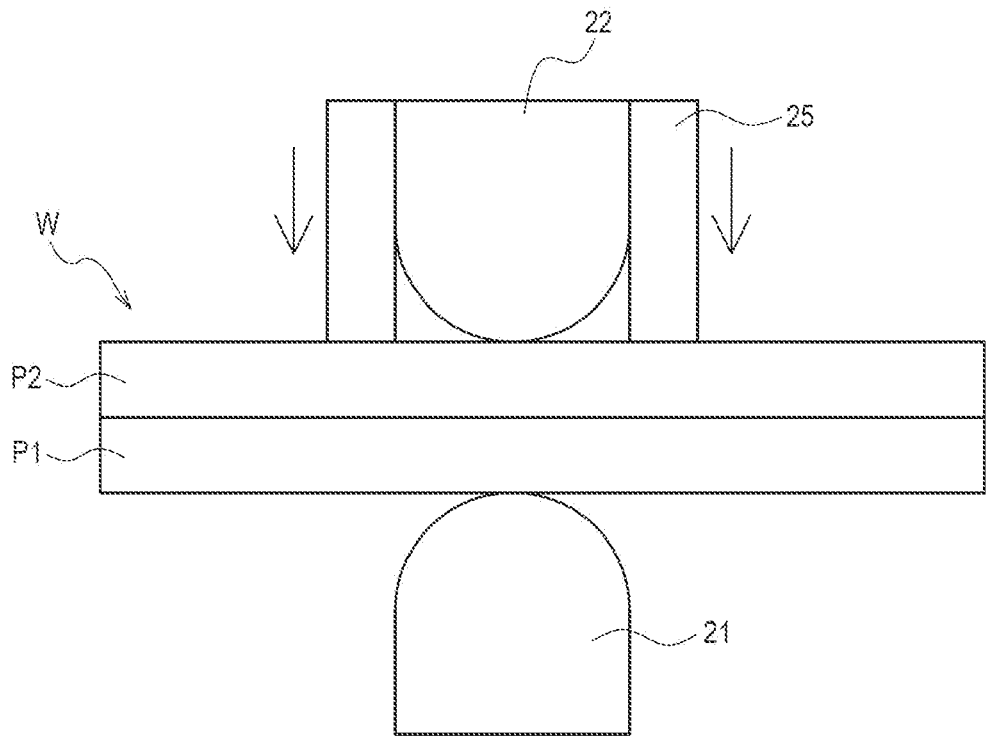
FIG. 5

METHOD OF RESISTANCE SPOT WELDING AND RESISTANCE SPOT WELDING APPARATUS

CROSS-REFERENCE TO RELATED APPLICATION

The present application claims the benefit of Japanese Patent Application No. 2020-117775 filed on Jul. 8, 2020 with the Japan Patent Office, the entire disclosure of which is incorporated herein by reference.

BACKGROUND

The present disclosure relates to a method of resistance spot welding and a resistance spot welding apparatus.

Various methods are known for resistance spot welding of high-tensile steel plates coated with zinc (see, for example, Japanese Unexamined Patent Application Publication No. 2003-164975).

SUMMARY

In the above-mentioned methods, nuggets are formed in a certain size or larger in order to reduce Liquid Metal Embrittlement (LME)-induced cracking, which results from zinc plating, in high-tensile steel plates. Nuggets, however, may not be formed with sufficient diameters depending on the thicknesses of steel plates.

It is desirable that one aspect of the present disclosure provides a method of resistance spot welding that can inhibit LME-induced cracking in zinc-coated steel plates irrespective of their thicknesses.

One aspect of the present disclosure provides a method of resistance spot welding. The method comprises welding a workpiece with a resistance spot welding apparatus. The workpiece includes two or more steel plates in an overlapping state. The two or more steel plates include at least one steel plate coated with zinc. The welding comprises causing a cooling rate of a high-tensile steel plate among the two or more steel plates to be higher than a cooling rate of an other steel plate among the two or more steel plates. The high-tensile steel plate has a tensile strength higher than a tensile strength of the other steel plate.

In the above-described method, the high-tensile steel plate is cooled more rapidly than the other steel plate. This reduces the degree of distortion (specifically, tensile stress) of the high-tensile steel plate to be smaller than the degree of distortion of the other steel plate, thereby inhibiting LME-induced cracking in the high-tensile steel plate irrespective of the thicknesses of the steel plates to be welded.

In one aspect of the present disclosure, the resistance spot welding apparatus may comprise a first electrode configured to be in contact with the high-tensile steel plate, and a second electrode configured to be in contact with the other steel plate. An area of contact between the first electrode and the high-tensile steel plate may be larger than an area of contact between the second electrode and the other steel plate. This configuration makes it possible to cause the cooling rate of the high-tensile steel plate to be higher than the cooling rate of the other steel plate with a relatively simple structure, thereby reducing the equipment cost of the resistance spot welding apparatus and reliably inhibiting LME-induced cracking.

Another aspect of the present disclosure provides a resistance spot welding apparatus configured to weld a workpiece including two or more steel plates in an overlapping state. The two or more steel plates include at least one steel plate coated with zinc. The resistance spot welding apparatus is configured to cause a cooling rate of a high-tensile steel plate among the two or more steel plates to be higher than a cooling rate of an other steel plate among the two or more steel plates. The high-tensile steel plate has a tensile strength higher than a tensile strength of the other steel plate. The cooling rate of the high-tensile steel plate and the cooling rate of the other steel plate are cooling rates at a time of welding.

This configuration inhibits LME-induced cracking in the high-tensile steel plate irrespective of the thicknesses of the steel plates to be welded.

In one aspect of the present disclosure, the resistance spot welding apparatus may comprise a first electrode configured to be in contact with the high-tensile steel plate, and a second electrode configured to be in contact with an other steel plate. An area of contact between the first electrode and the high-tensile steel plate may be larger than an area of contact between the second electrode and the other steel plate. This configuration reduces the equipment cost of the resistance spot welding apparatus and reliably inhibits LME-induced cracking.

BRIEF DESCRIPTION OF THE DRAWINGS

Example embodiments of the present disclosure will be described hereinafter with reference to the accompanying drawings, in which:

FIG. 4A is a cross-sectional diagram showing the first electrode of the resistance welding device in FIG. 1;

FIG. 4B is a cross-sectional diagram showing the second electrode of the resistance welding device in FIG. 1;

FIG. 5 is a schematic diagram showing the first electrode, the second electrode, and a backup of the resistance welding device in FIG. 1.

DETAILED DESCRIPTION OF EXEMPLARY EMBODIMENTS

1. First Embodiment

[1-1. Configuration]

Figure 1:
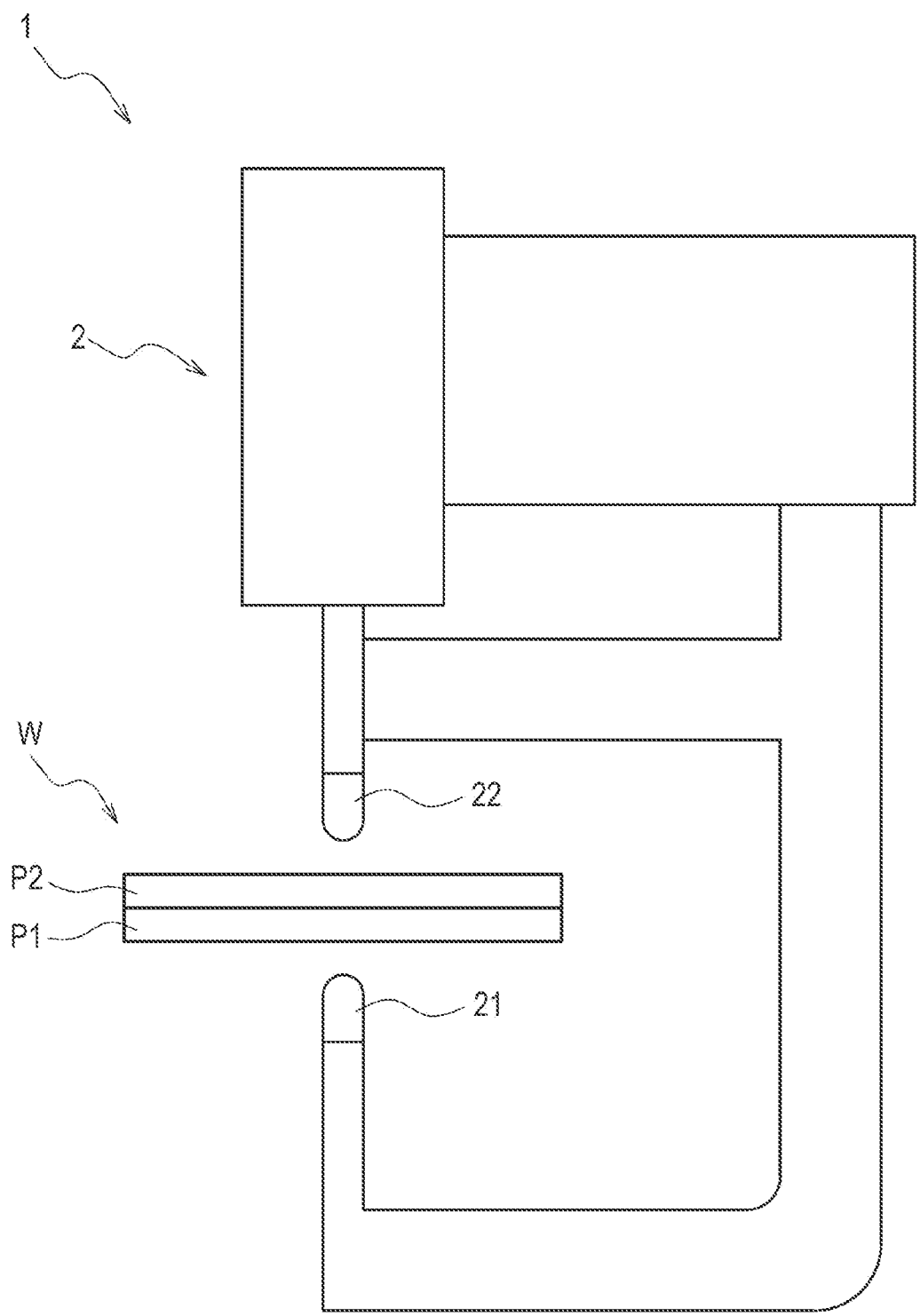
FIG. 1 is a schematic diagram showing a resistance spot welding apparatus according to an embodiment.

A resistance spot welding apparatus 1 shown in FIG. 1 is configured to weld a workpiece W including a high-tensile steel plate P1 and a low-tensile steel plate P2 in an overlapping state. The resistance spot welding apparatus 1 comprises a resistance welding device 2.

The high-tensile steel plate P1 has a tensile strength higher than that of the low-tensile steel plate P2. The tensile strength of the high-tensile steel plate P1 is, for example, 1470 MPa. The tensile strength of the low-tensile steel plate P2 is, for example, 440 MPa or 270 MPa. In the present embodiment, the low-tensile steel plate P2 is placed on top of the high-tensile steel plate P1.

At least one of the high-tensile steel plate P1 and the low-tensile steel plate P2 is coated with zinc. In the present embodiment, only the high-tensile steel plate P1 is coated with zinc while the low-tensile steel plate P2 is not coated with zinc. Alternatively, only the low-tensile steel plate P2 may be coated with zinc while the high-tensile steel plate P1 is not; or both the high-tensile steel plate P1 and the low-tensile steel plate P2 may be coated with zinc. The zinc used for plating includes zinc alloys.

<Resistance Welding Device>

The resistance welding device 2 welds the high-tensile steel plate P1 and the low-tensile steel plate P2, which are placed as a workpiece W, in the direction of the thicknesses (hereinafter "thickness direction") of the high-tensile and low-tensile steel plates P1, P2 by resistance spot welding.

The resistance welding device 2 comprises a first electrode 21 and a second electrode 22. The first electrode 21 is disposed to be positioned below the workpiece W. The second electrode 22 is disposed to be positioned above the workpiece W and thereby to interpose the workpiece W between the first and second electrodes 21, 22 in the thickness direction. The second electrode 22 is movable in the up-and-down directions relative to the first electrode 21.

The first and second electrodes 21, 22 each come into contact with the workpiece W when welding is performed. Specifically, the first electrode 21 is configured to be in contact with the high-tensile steel plate P1. The second electrode 22 is configured to be in contact with the low-tensile steel plate P2. A welding current flows between the first and second electrodes 21, 22 through the workpiece W.

Figure 2A:
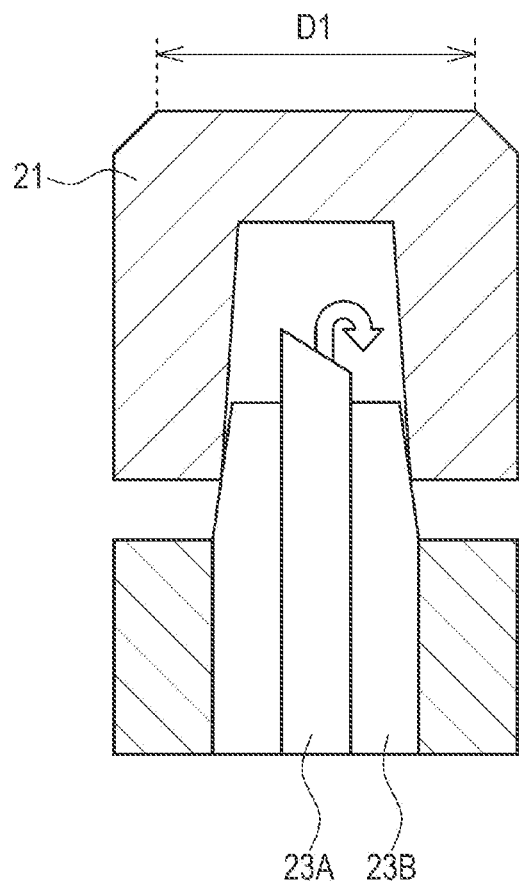
FIG. 2A is a schematic cross-sectional diagram showing a first electrode of a resistance welding device in FIG. 1.

As shown in FIG. 2A, the first electrode 21 comprises a coolant supply path 23A and a coolant collection path 23B arranged inside the first electrode 21. While welding is performed, a coolant (for example, water) is supplied from the coolant supply path 23A to the inside of the first electrode 21 to thereby cool the first electrode 21. The coolant that has reduced the temperature of the first electrode 21 is gathered from the coolant collection path 23B to be chilled with a heat exchanger (not shown) of the resistance welding device 2, and then sent again to the coolant supply path 23A.

Figure 2B:
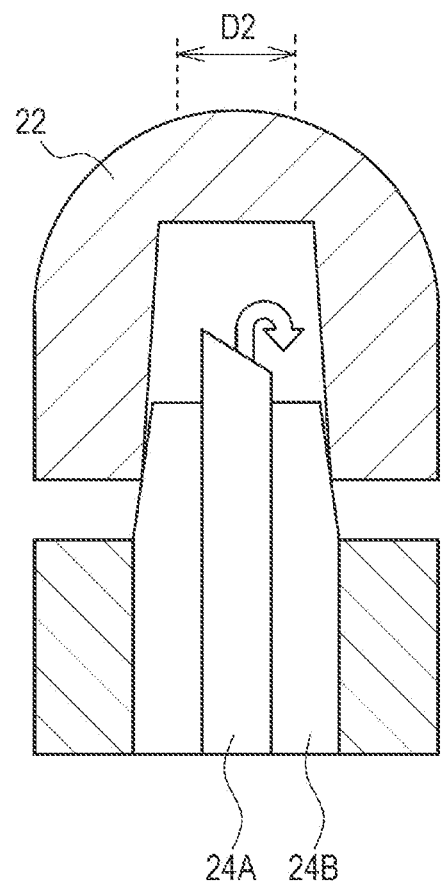
FIG. 2B is a cross-sectional diagram showing a second electrode of the resistance welding device in FIG. 1.

As shown in FIG. 2B, the second electrode 22 also comprises a coolant supply path 24A and a coolant collection path 24B arranged inside the second electrode 22. The second electrode 22 is cooled by circulation of the coolant similarly to the first electrode 21 while welding is performed.

In the present embodiment, the area of contact between the first electrode 21 and the high-tensile steel plate P1 is larger than that between the second electrode 22 and the low-tensile steel plate P2. Specifically, the first electrode 21 has, at its leading end, a flat contact portion that touches the steel plate P1, while the second electrode 22 has, at its leading end, a round contact portion that touches the steel plate P2. The contact portion of the first electrode 21 has a diameter D1 larger than a diameter D2 of the contact portion of the second electrode 22.

Since the area of contact between the first electrode 21 and the high-tensile steel plate P1 is larger than that between the second electrode 22 and the low-tensile steel plate P2, the cooling rate of the high-tensile steel plate P1 resulting from heat exchange between the high-tensile steel plate P1 and the first electrode 21 is higher than that of the low-tensile steel plate P2 resulting from heat change between the low-tensile steel plate P2 and the second electrode 22.

In other words, the resistance spot welding apparatus 1 is configured to cause the cooling rate of a welded portion of the high-tensile steel plate P1 at the time of welding (specifically, during welding and after welding) to be higher than the cooling rate of a welded portion of the low-tensile steel plate P2 at the time of welding.

Figure 3A:
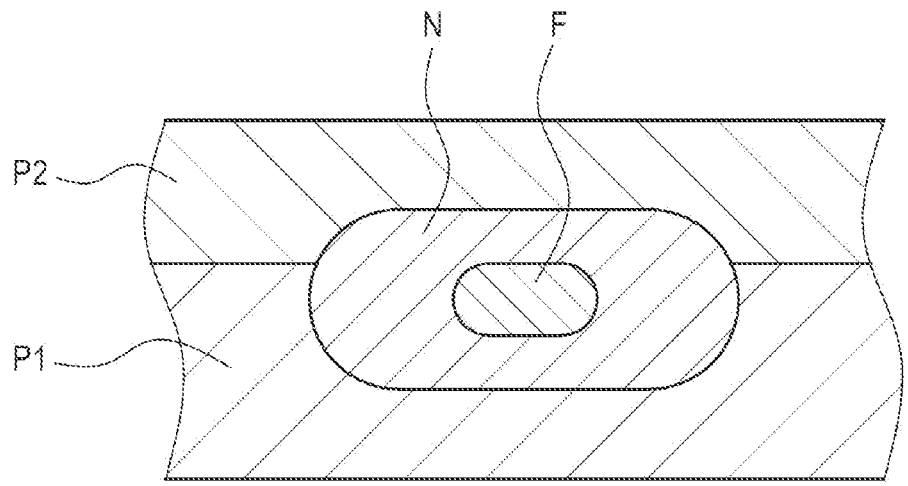
FIGS. 3A and 3B are cross-sectional diagrams showing welded steel plates.
Figure 3B:
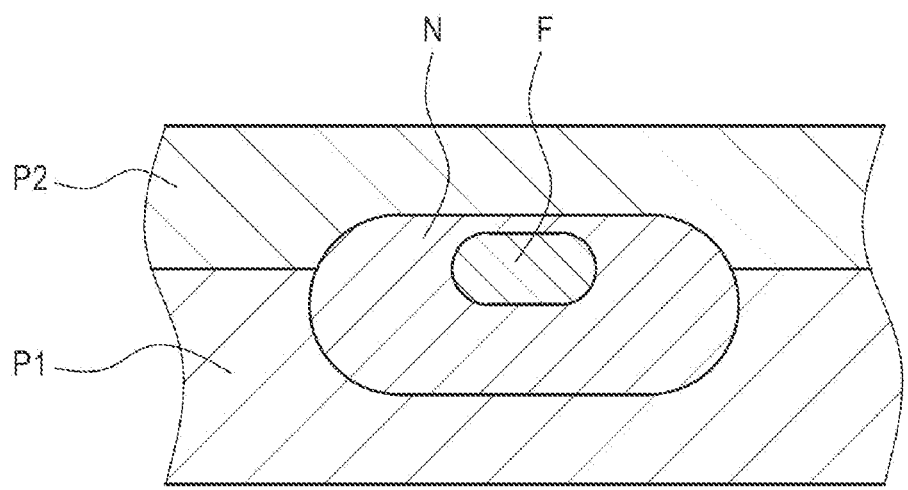

As shown in FIG. 3A, in the case where the high-tensile steel plate P1 and the low-tensile steel plate P2 have the same cooling rate, a nugget N formed by welding has a final solidification portion F, which is the last portion to solidify during cooling, at the center of the nugget N. As shown in FIG. 3B, in the case where the cooling rate of the high-tensile steel plate P1 is higher than that of the low-tensile steel plate P2, the final solidification portion F is produced at a position close to the low-tensile steel plate P2.

That is, cooling the high-tensile steel plate P1 more rapidly than the low-tensile steel plate P2 leads to formation of the final solidification portion F at a position away from the surface of the high-tensile steel plate P1. This inhibits cooling distortion from being concentrated in the high-tensile steel plate P1.

Apart from the adjustment of the area of contact between the first electrode 21 and the steel plate P1 and that between the second electrode 22 and the steel plates P2, the resistance spot welding apparatus 1 may cause the cooling rate of the high-tensile steel plate P1 to be higher than that of the low-tensile steel plate P2 by the means exemplified below.

For example, the resistance spot welding apparatus 1 may adjust the cooling rates by the structures or the materials of the first and second electrodes 21, 22. Specifically, as shown in FIGS. 4A and 4B, the first electrode 21 may be formed to have a thickness T1 (i.e., the distance from an internal space S, in which the coolant circulates, to the contact portion that touches the high-tensile steel plate P1) smaller than a thickness T2 of the second electrode 22 (i.e., the distance from an internal space S to the contact portion that touches the low-tensile steel plate P2). Additionally or alternatively, the first electrode 21 may be designed to have a thermal conductivity higher than the thermal conductivity of the second electrode 22.

For another example, the resistance spot welding apparatus 1 may adjust the cooling rates by the temperatures, flow rates, or types of the coolants. Specifically, the temperature of the coolant for the first electrode 21 may be set to be lower than that of the coolant for the second electrode 22. The flow rate of the coolant in the first electrode 21 may be set to be higher than that of the coolant in the second electrode 22. The coolant for the first electrode 21 may have a thermal absorptivity (i.e., thermal conductivity) higher than that of the coolant for the second electrode 22. For instance, the coolant for the first electrode 21 may be water while the coolant for the second electrode 22 may be glycerin.

For still another example, the resistance spot welding apparatus 1 may adjust the cooling rates by the pressures of the first and second electrodes 21, 22 against the steel plates P1, P2. Specifically, as shown in FIG. 5, the workpiece W may be pressed with a backup 25 (specifically, together with the second electrode 22) from the side on which the low-tensile steel plate P2 is placed against the first electrode 21 so that the pressure of the first electrode 21 against the high-tensile steel plate P1 is caused to be higher than that of the second electrode 22 against the low-tensile steel plate P2.

The backup 25 is a cylindrical member surrounding the second electrode 22, or columnar members disposed at even intervals to surround the second electrode 22. Examples of the material used for the backup 25 include metal and rubber.

Moreover, the resistance spot welding apparatus 1 may comprise a sprinkler configured to spray water onto the high-tensile steel plate P1 or the first electrode 21 in contact with the high-tensile steel plate P1 so as to cause the cooling rate of the high-tensile steel plate P1 to be higher than that of the low-tensile steel plate P2.

Furthermore, the resistance spot welding apparatus 1 may comprise a Peltier device that is attached to the first electrode 21 and cools the first electrode 21 upon being energized so as to cause the cooling rate of the high-tensile steel plate P1 to be higher than that of the low-tensile steel plate P2.

Still furthermore, the resistance spot welding apparatus 1 may comprise a cooling device that cools the high-tensile steel plate P1 or the first electrode 21 in contact with the high-tensile steel plate P1 using a coolant gas, such as air, so as to cause the cooling rate of the high-tensile steel plate P1 to be higher than that of the low-tensile steel plate P2.

[1-2. Method of Manufacturing]

Figure 6:
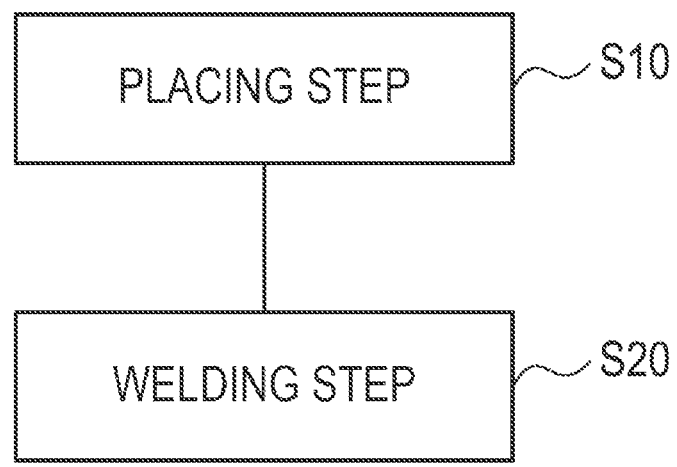
FIG. 6 is a flowchart illustrating a method of resistance spot welding according to an embodiment.

The method of resistance spot welding shown in FIG. 6 comprises a placing step S10 and a welding step S20. The method of resistance spot welding according the present embodiment is implemented with, for example, the resistance spot welding apparatus 1 in FIG. 1.

<Placing Step>

In this step, the workpiece W, including the high-tensile steel plate P1 and the low-tensile steel plate P2 overlapping in the thickness direction, is placed between the first and second electrodes 21, 22 of the resistance welding device 2.

<Welding Step>

In this step, the high-tensile steel plate P1 and low-tensile steel plate P2 in the overlapping state are welded with the resistance spot welding apparatus 1.

In this step, the above-described adjustment of the area of contact between the first electrode 21 and the steel plate P1 and that between the second electrode 22 and the steel plate P2, for example, causes the cooling rate of the welded portion of the high-tensile steel plate P1 to be higher than that of a weld portion of the low-tensile steel plate P2.

[1-3. Effects]

In the embodiment described in detail above, the following effects can be achieved.

(1a) Cooling the high-tensile steel plate P1 more rapidly than the low-tensile steel plate P2 reduces the degree of distortion (specifically, tensile stress) of the high-tensile steel plate P1 to be smaller than that of the low-tensile steel plate P2. This inhibits LME-induced cracking in the high-tensile steel plate P1 irrespective of the thicknesses of the steel plates P1, P2 to be welded.

(1b) Providing a large area of contact between the first electrode 21 and the high-tensile steel plate P1 as compared with the area of contact between the second electrode 22 and the low-tensile steel plate P2 makes it possible to cause the cooling rate of the high-tensile steel plate P1 to be higher than that of the low-tensile steel plate P2 with a relatively simple structure. This can reduce the equipment cost of the resistance spot welding apparatus 1 and reliably inhibit LME-induced cracking.

(1c) Shifting of the center of gravity in the nugget N toward the low-tensile steel plate P2 facilitates concentration of crack stress in the low-tensile steel plate P2, which is more resistant to cracking than the high-tensile steel plate P1. This inhibits cracking in the workpiece W.

2. Other Embodiments

An embodiment of the present disclosure has been described hereinabove; the present disclosure, however, should not be limited to the above-described embodiment and may be carried out in variously modified manners.

(2a) In the resistance spot welding apparatus 1 and the method of resistance spot welding of the above-described embodiment, the workpiece W may include three or more steel plates. In other words, one or more steel plate(s) may be interposed between the high-tensile steel plate P1 and the low-tensile steel plate P2.

(2b) In the resistance spot welding apparatus 1 and the method of resistance spot welding of the above-described embodiment, the high-tensile steel plate P1 may be placed on top of the low-tensile steel plate P2. Moreover, the direction in which the first electrode 21 and the second electrode 22 face each other (in other words, the direction to interpose the workpiece W therebetween) is not limited to the vertical direction. For example, the first electrode 21 and the second electrode 22 may be disposed in a manner to interpose the workpiece W in the horizontal direction.

(2c) Functions of one component in the aforementioned embodiments may be achieved by two or more components, and a function of one component may be achieved by two or more components. Moreover, functions of two or more components may be achieved by one component, and a function achieved by two or more components may be achieved by one component. Furthermore, part of the configurations of the aforementioned embodiments may be omitted. At least part of the configurations of the aforementioned embodiments may be added to or replaced with other configurations of the aforementioned embodiments. Any mode included in the technical ideas identified by the language in the claims are embodiments of the present disclosure.

What is claimed is:

1. A method of resistance spot welding, the method comprising welding a workpiece, including two or more steel plates in an overlapping state, with a resistance spot welding apparatus including a first electrode and a second electrode, the first electrode being configured to be in contact with a high-tensile steel plate of the two or more steel plates, the second electrode being configured to be in contact with an other steel plate of the two or more steel plates, the welding comprising:
    causing a cooling rate of the high-tensile steel plate to be higher than a cooling rate of the other steel plate, the high-tensile steel plate having a tensile strength higher than a tensile strength of the other steel plate; and
    cooling the first electrode by circulation of a first coolant inside the first electrode and cooling the second electrode by circulation of a second coolant inside the second electrode,
wherein the first coolant configured to circulate in the first electrode has a thermal absorptivity higher than a thermal absorptivity of the second coolant configured to circulate in the second electrode, and
wherein at least one of the high-tensile steel plate or the other steel plate is coated with zinc.

2. The method of resistance spot welding according to claim 1,
wherein an area of contact between the first electrode and the high-tensile steel plate is larger than an area of contact between the second electrode and the other steel plate.

3. A resistance spot welding apparatus configured to weld a workpiece including two or more steel plates in an overlapping state, with a steel plate of the two or more steel plates being a high-tensile steel plate, the resistance spot welding apparatus including a first electrode and a second electrode, the first electrode being configured to be in contact with the high-tensile steel plate, the second electrode being configured to be in contact with an other steel plate of the two or more steel plates, the resistance spot welding apparatus being configured to cause a cooling rate of the high-tensile steel plate to be higher than a cooling rate of the other steel plate, the high-tensile steel plate having a tensile strength higher than a tensile strength of the other steel plate, and the cooling rate of the high-tensile steel plate and the cooling rate of the other steel plate being cooling rates at a time of welding, wherein the first electrode is cooled by circulation of a first coolant inside the first electrode and the second electrode is cooled by circulation of a second coolant inside the second electrode, wherein the first coolant configured to circulate in the first electrode has a thermal absorptivity higher than a thermal absorptivity of the second coolant configured to circulate in the second electrode, and wherein at least one of the high-tensile steel plate or the other steel plate is coated with zinc.

4. The resistance spot welding apparatus according to claim 3, wherein an area of contact between the first electrode and the high-tensile steel plate is larger than an area of contact between the second electrode and the other steel plate.

5. The method of resistance spot welding according to claim 1, wherein the welding includes forming a final solidification portion in a nugget away from a surface of the high-tensile steel plate by causing the cooling rate of the high-tensile steel plate to be higher than the cooling rate of the other steel plate.

6. The resistance spot welding apparatus according to claim 3, wherein the resistance spot welding apparatus is configured such that a final solidification portion of a weld of the workpiece is a nugget is formed away from a surface of the high-tensile steel plate caused by the cooling rate of the high-tensile steel plate during the welding being higher than the cooling rate of the other steel plate during the welding.

7. The method of resistance spot welding according to claim 1, wherein a thickness of a contact portion, at a leading end of the first electrode, touching the high-tensile steel plate is larger than a thickness of a contact portion, at a leading end of the second electrode, touching the other steel plate.

8. The resistance spot welding apparatus according to claim 3, wherein a thickness of a contact portion, at a leading end of the first electrode, touching the high-tensile steel plate is larger than a thickness of a contact portion, at a leading end of the second electrode, touching the other steel plate.

* * * * *